US009051848B2

(12) United States Patent
Castan et al.

(10) Patent No.: US 9,051,848 B2
(45) Date of Patent: Jun. 9, 2015

(54) TURBOCHARGER HOUSING AND BEARING LOCATING PIN

(75) Inventors: Joel Castan, Chantraine (FR);
Dominique Armand, Uxegney (FR);
Gerard Dieudonne, Les Forges (FR);
Lionel Toussaint, Gerardmer (FR);
Olivier Millotte, Les Forges (FR)

(73) Assignee: Honeywell International Inc., Morristown, NJ (US)

( * ) Notice: Subject to any disclaimer, the term of this patent is extended or adjusted under 35 U.S.C. 154(b) by 771 days.

(21) Appl. No.: 13/291,390

(22) Filed: Nov. 8, 2011

(65) Prior Publication Data

US 2013/0115080 A1    May 9, 2013

(51) Int. Cl.
*F01D 25/16* (2006.01)
*F01D 25/18* (2006.01)
*F16C 33/08* (2006.01)

(52) U.S. Cl.
CPC ......... *F01D 25/162* (2013.01); *Y10T 29/49243* (2015.01); *Y10T 403/54* (2015.01); *F16C 2360/24* (2013.01); *F01D 25/166* (2013.01); *F01D 25/18* (2013.01); *F05D 2220/40* (2013.01); *F05D 2260/37* (2013.01); *F16C 33/08* (2013.01)

(58) Field of Classification Search
USPC ............................................................ 415/229
See application file for complete search history.

(56) References Cited

U.S. PATENT DOCUMENTS

| 4,344,717 | A  | 8/1982  | Merz |
| 7,461,979 | B2 | 12/2008 | Mavrosakis |
| 7,753,591 | B2 | 7/2010  | Petitjean |
| 8,449,199 | B2 * | 5/2013 | Barlog ........................ 384/512 |
| 2007/0003175 | A1 * | 1/2007 | Petitjean et al. ............ 384/322 |
| 2011/0176907 | A1 | 7/2011 | Groves |
| 2012/0051906 | A1 * | 3/2012 | House et al. ................ 415/229 |

FOREIGN PATENT DOCUMENTS

| EP | 1002185 B1 | 10/2003 |
| EP | 1582755 A2 | 10/2005 |
| EP | 2325457 A2 | 5/2011 |
| WO | WO 2012141846 A2 * | 10/2012 |

OTHER PUBLICATIONS

EPO Partial European Search Report for EP Application No. 12191499 (6 pages).

(Continued)

*Primary Examiner* — Richard Edgar
(74) *Attorney, Agent, or Firm* — Brian J. Pangrle (57) ABSTRACT

A turbocharger assembly includes: a housing with a through-bore and a cross-bore that intersects the through-bore to define an upper portion of the cross-bore with a first diameter and a lower portion of the cross-bore with a second diameter where the first diameter exceeds the second diameter; a bearing disposed in the through-bore of the housing where the bearing includes a through-bore configured to support a shaft and a cross-bore that intersects the through-bore; and a locating pin with a diameter that exceeds the second diameter of the lower portion of the cross-bore of the housing, the locating pin press-fit at least partially into the lower portion of the cross-bore of the housing and disposed at least partially in the lower portion of the cross-bore of the bearing to locate the bearing in the through-bore of the housing. Various other examples of devices, assemblies, systems, methods, etc., are also disclosed.

18 Claims, 9 Drawing Sheets

(56) References Cited

OTHER PUBLICATIONS

Lewis et al., "Measurement of Interference Pressure in Interference Fits", White Rose Research Online at http://eprints.whiterose.ac.uk/9180/, Professional Engineering Publishing, 2005.

Boissonnet et al., "Tribological study of a press-fit assembling process", ICTMP 2010, Nice, France (2010).

Stamenkovic et al., "Investigation of the press fit joints by the tribology aspect", Facta Universitatis, Series: Mechanical Engineering vol. 1, No. 8, 2001, pp. 1057-1064.

* cited by examiner

Method 510

Method 530

TURBOCHARGER HOUSING AND BEARING LOCATING PIN

TECHNICAL FIELD

Subject matter disclosed herein relates generally to turbomachinery for internal combustion engines and, in particular, to housings and bearing locating pins as well as assemblies for installation of locating pins.

BACKGROUND

Exhaust driven turbochargers include a rotating group that includes a turbine wheel and a compressor wheel that are connected to one another by a shaft. During operation, depending on factors such as sizes of various turbocharger components, a shaft may be expected to rotate at speeds in excess of 200,000 rpm. To ensure proper rotordynamic performance, a rotating group should be well balanced and well supported.

In many conventional arrangements, a turbocharger shaft is rotatably supported within a center housing by one or more bearings (e.g., oil lubricated, air bearings, ball bearings, magnetic bearings, etc.). In some arrangements, a bearing or bearings may be located in a bore of a center housing via one or more locating mechanisms. For example, a locating pin may be employed as part of a locating mechanism to locate a semi-floating bearing in a bore of a housing where the locating pin is inserted into a locating pin bore of the housing accessible via a lubricant drain of the housing and pressed until it extends into the bore of the housing and into an opening in the semi-floating bearing. In such an arrangement, some clearance exists between an outer surface of the locating pin and an inner surface of the opening in the semi-floating bearing to allow the bearing to "float" on a lubricant film disposed between an outer surface of the bearing and an inner surface of the bore of the housing. Such a lubricant film may be referred to, for example, as a squeeze film damper (SFD), which may depend on geometry (e.g., length, diameter, radial clearance, etc.), lubricant characteristics (e.g., viscosity, temperature behavior, etc.), lubricant flow rate, lubricant pressure, etc.

In addition to lubricant dynamics, performance of a semi-floating bearing may be impacted by various mechanical factors. For example, as to clearance between an outer surface of a locating pin and an inner surface of an opening in a semi-floating bearing, mechanical factors such as surface roughness, wear, particulate generation, etc., may act to hinder beneficial movement of the bearing. In turn, such factors may reduce benefits provided by a squeeze film, for example, by altering geometry, pressure response, increasing friction force or other force associated with movement of a bearing with respect to a locating pin. Depending on the nature of hindrance to movement, a turbocharger may experience increased noise, vibration, harshness, wear, etc., and diminished performance and lifetime.

Technologies, techniques, etc., described in various examples herein can act to reduce risk of clearance-related issues associated with locating mechanisms for bearings. Such technologies, techniques, etc., may increase production quality, increase performance, reduce NVH, or achieve other benefits for turbomachinery.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

In various examples, a turbocharger assembly can include: a housing that includes a through-bore and a cross-bore that intersects the through-bore to define an upper portion of the cross-bore that includes a first diameter and a lower portion of the cross-bore that includes a second diameter where the first diameter exceeds the second diameter; a bearing disposed in the through-bore of the housing where the bearing includes a through-bore configured to support a shaft and a cross-bore that intersects the through-bore; and a locating pin that includes a diameter that exceeds the second diameter of the lower portion of the cross-bore of the housing, the locating pin press-fit at least partially into the lower portion of the cross-bore of the housing and disposed at least partially in the lower portion of the cross-bore of the bearing to locate the bearing in the through-bore of the housing.

In various examples, a turbocharger assembly can include: a housing that has a through-bore and a cross-bore where the cross-bore includes an upper portion configured to pass lubricant to the through-bore and a lower portion; a bearing disposed in the through-bore of the housing where the bearing includes a through-bore configured to support a shaft and a cross-bore where the cross-bore of the bearing includes an upper portion configured to pass lubricant from the upper portion of the cross-bore of the housing to the through-bore of the bearing and a lower portion; and a locating pin that includes a press-fit scarred portion disposed in the lower portion of the cross-bore of the housing and an unscarred locating portion disposed at least partially in the lower portion of the cross-bore of the bearing to locate the bearing in the through-bore of the housing.

With respect to a press-fit scarred portion of a locating pin, such scarring can stem from an assembly process that includes press fitting the locating pin into the lower portion of the cross-bore of the housing using a tool inserted into the upper portion of the cross-bore of the housing. In such a manner, a portion of the locating pin will not experience press-fit scarring as it does not pass into or through the lower portion of the cross-bore of the housing and, hence, will be available as an unscarred locating portion to locate the bearing in the through-bore of the housing. Such an assembly process acts, in general, to preserve the surface finish of at least a portion of a locating pin, which, in turn, can enhance interactions occurring between a bearing and the locating pin when compared to a conventional assembly process.

For a conventional assembly process where press fitting of a locating pin into a cross-bore of a housing occurs via a lubricant drain, the portion of the locating pin that interacts with a bearing is scarred, which can increase friction, wear, etc. Further, a risk exists during installation that the bearing and cross-bore of the housing will not be aligned and that the locating pin will contact the bearing. As the locating pin may be installed using considerable force, any contact between the locating pin and the bearing may damage the locating pin, the bearing, a through-bore of a center housing (e.g., via transmission of force from the pin to the bearing and to the through-bore), generate debris, etc. Further, as the force applied to the locating pin may be considerable, indication of inappropriate contact between the locating pin and the bearing may be difficult to sense and, if sensed, such sensing may be too late (e.g., after some damage has been inflicted to the locating pin, the bearing, the housing, etc.).

In an example embodiment, an assembly process can include passing a locating pin via a lubricant inlet passage in a center housing and into an lubricant inlet side opening of a bearing. Where dimensions of the lubricant passage and the opening of the bearing exceed a diameter of the locating pin, such a process requires little force, which allows for any misalignment between a lubricant drain side opening of the bearing and a lower cross-bore of the center housing to be readily recognized. Once positioned, application of force may occur to press-fit the locating pin a certain depth into the lower cross-bore of the center housing. In such a process, the press-fit depth is less than the length of the locating pin such that a portion of the locating pin remains in the lubricant drain side opening of the bearing to locate the bearing such that this portion of the locating pin will not be scuffed because it is not exposed to any type of assembly process surface press-fit interactions.

In an example embodiment, an installation process may include guiding a locating pin using a guide rod inserted into a cross-bore of a housing via a lubricant drain. In such an example, movement of the guide rod may be opposed by a press rod inserted into a cross-bore of the housing via a lubricant inlet where the locating pin is located between the two rods. With force applied to the locating pin via the press rod, the locating pin can be press-fit to a depth optionally indicated by a stop associated with the guide rod. For example, force of a press-fit may increase in a relatively linear manner with respect to depth and then increase significantly once a stop is reached. In such an example, the press-fit may be approximated by one slope and the stop approximated by another slope where an inflection or intersection point may be sensed to cause termination of the application of force to the locating pin via the press rod.

Below, an example of a turbocharged engine system is described followed by various examples of components, assemblies, methods, etc.

Figure 1:
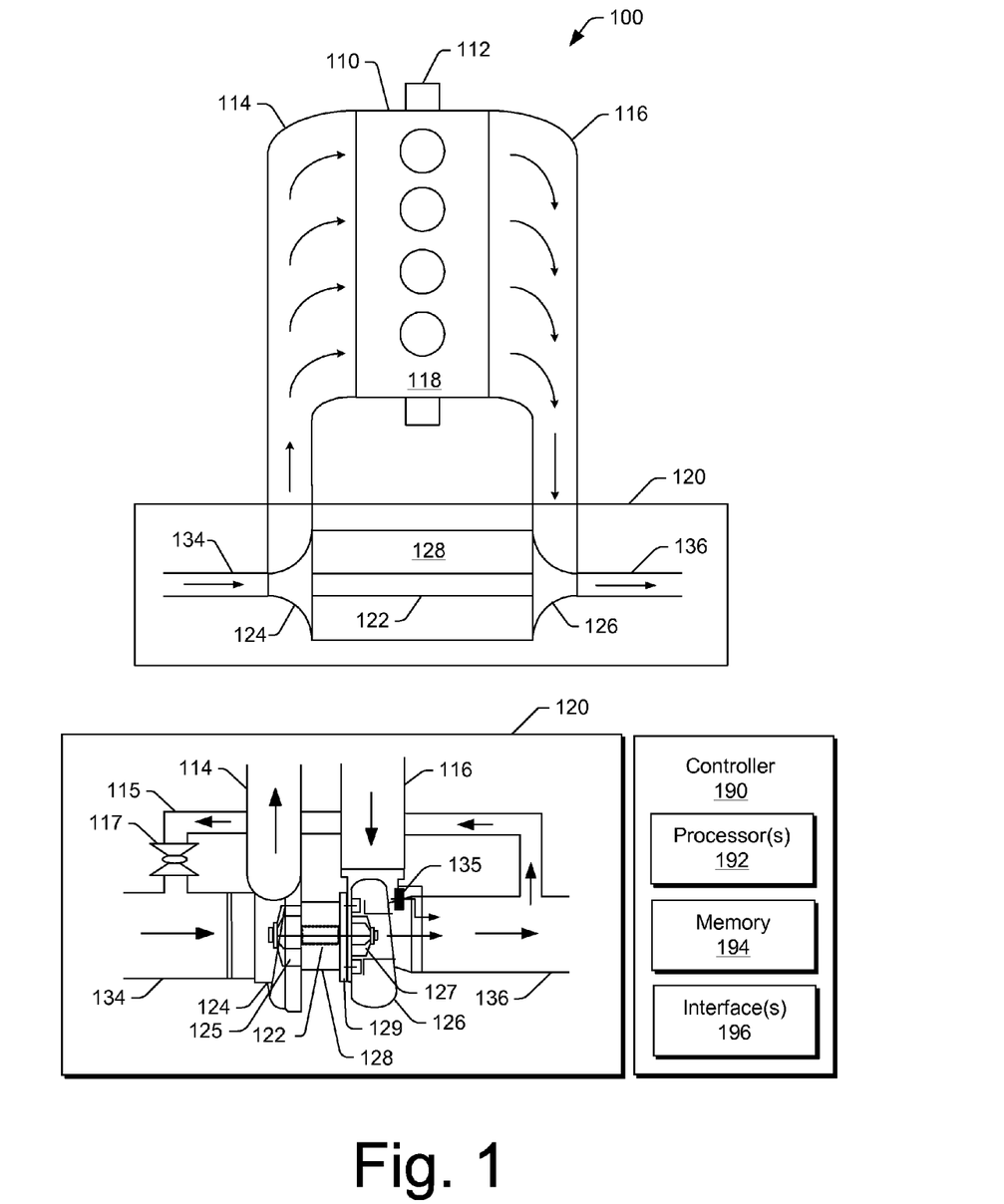
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

Also shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In operation, the turbocharger 120 acts to extract energy from exhaust of the internal combustion engine 110 by passing the exhaust through the turbine 126. As shown, rotation of a turbine wheel 127 of the turbine 126 causes rotation of the shaft 122 and hence a compressor wheel 125 (e.g., impeller) of the compressor 124 to compress and enhance density of inlet air to the engine 110. By introducing an optimum amount of fuel, the system 100 can extract more specific power out of the engine 100 (e.g., compared to a non-turbocharged engine of the same displacement). As to control of exhaust flow, in the example of FIG. 1, the turbocharger 120 includes a variable geometry unit 129 and a wastegate valve 135. The variable geometry unit 129 may act to control flow of exhaust to the turbine wheel 127. The wastegate valve (or simply wastegate) 135 is positioned proximate to the inlet of the turbine 126 and can be controlled to allow exhaust from the exhaust port 116 to bypass the turbine wheel 127.

Further, to provide for exhaust gas recirculation (EGR), such a system may include a conduit to direct exhaust to an intake path. As shown in the example of FIG. 1, the exhaust outlet 136 can include a branch 115 where flow through the branch 115 to the air inlet path 134 may be controlled via a valve 117. In such an arrangement, exhaust may be provided upstream of the compressor 124.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an exhaust gas recirculation valve, an electric motor, or one or more other components associated with an engine, a turbocharger (or turbochargers), etc.

Figure 2:
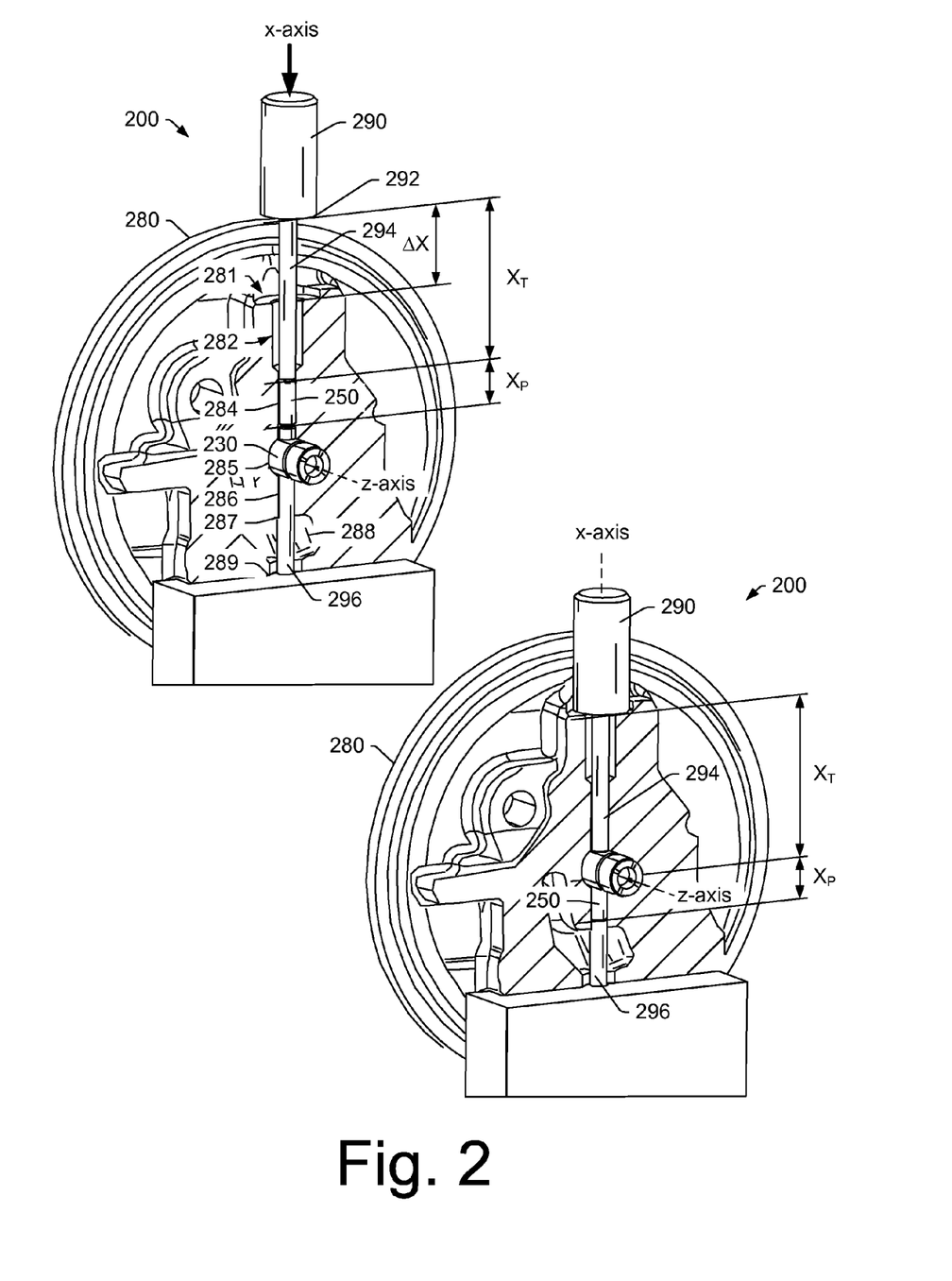
FIG. 2 is a series of cross-sectional perspective views of an example of an assembly and an assembly process to install a locating pin.

FIG. 2 shows two cross-sectional views of an example of an assembly 200 that includes a bearing 230, a locating pin 250, a center housing 280 and installation components 290 and 296 for installing the locating pin 250 with respect to the bearing 230 and the center housing 280. In FIG. 2, the upper view corresponds to a pre-press-fit state and the lower view corresponds to a post-press-fit state. Various dimensions are shown in FIG. 2 with reference to an x-axis which is orthogonal to a z-axis. The x-axis corresponds to a cross-bore of the center housing 280 while the z-axis corresponds to a through-bore 285 of the center housing 280. In the example of FIG. 2, the cross-bore spans a distance defined by a lubricant inlet 281 and a lubricant drain 289. In between, the inlet 281 and the drain 289, the cross-bore includes a lubricant well portion 282, an upper portion 284, a lower portion 286, and an opening 287 at a lubricant drain well portion 288. As shown, the through-bore 285 of the center housing is disposed between the upper portion 284 of the cross-bore and the lower portion 286 of the cross-bore.

Dimensions along the x-axis are provided for a stem 294 of the tool 290 ($X_T$) and the locating pin 250 ($X_P$). In a pre-press-fit state, a base 292 of the tool 290 is positioned a distance ΔX above the lubricant inlet 281 and the tool 296 is positioned such that its end extends into the upper portion of the cross-bore 284 to align the bearing 230 in the through-bore 285 and to contact an end of the locating pin 250. To transition from the pre-press-fit state to the post-press-fit state, the tool 296 is moved downward along the x-axis in response to some small amount of downward force applied to the tool 290, which causes the locating pin 250 to pass into a cross-bore of the bearing 230 and align with the lower portion 286 of the cross-bore of the housing 280. Once alignment has been achieved in this intermediate state, significant downward force is applied to the tool 290 to press-fit the locating pin 250 into the lower portion 286 of the cross-bore of the housing 280 to an appropriate depth such that a portion of the locating pin 250 remains in the through-bore 285 of the housing 280 and such that at least a portion of that portion remains in the cross-bore of the bearing 230 to locate the bearing 230 in the through-bore 285 of the housing 280.

Figure 3:
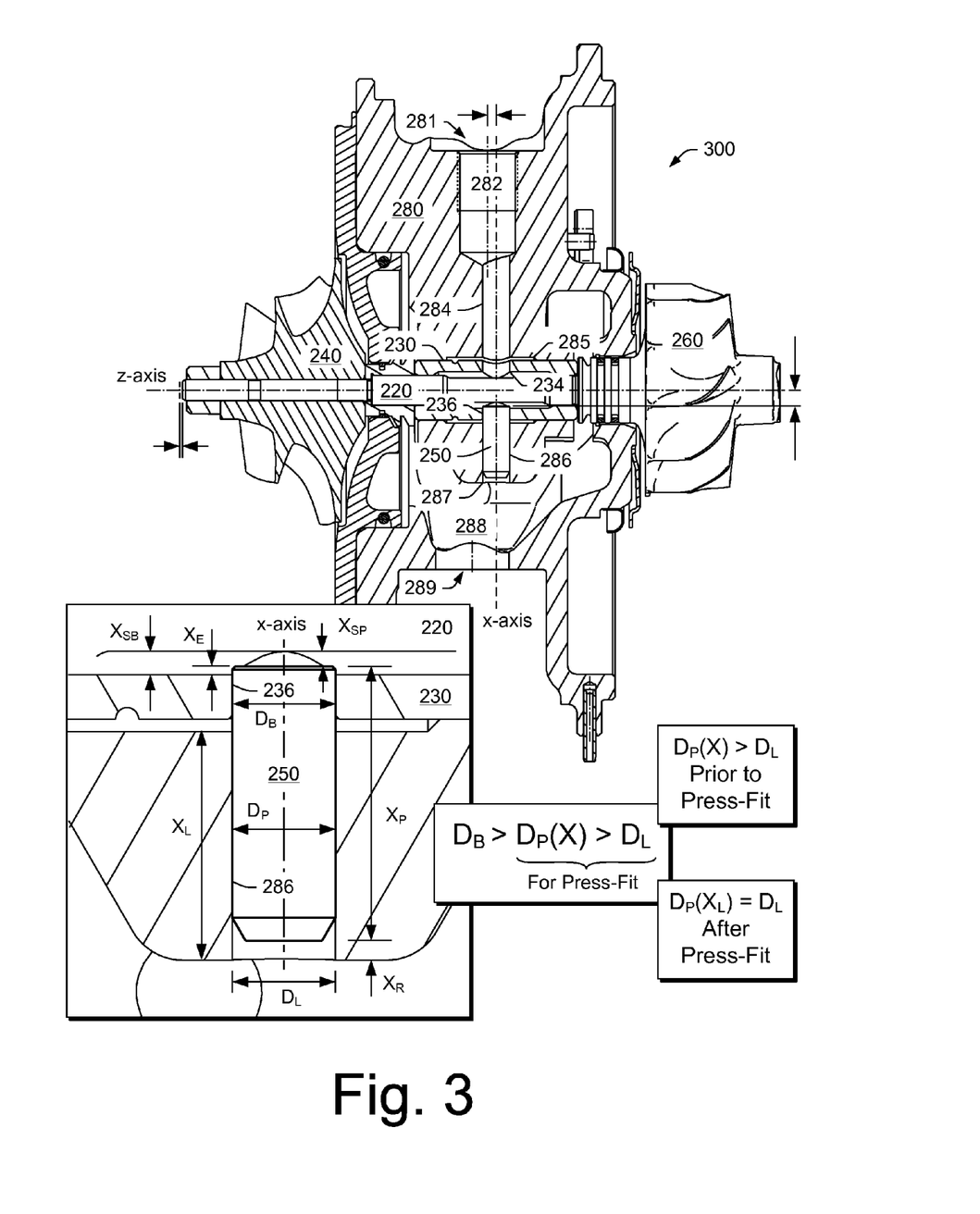
FIG. 3 is a cross-sectional side view of the assembly of FIG. 2 including various additional components.

FIG. 3 shows a cross-sectional view of an example of an assembly 300, which includes various components of the assembly 200 of FIG. 2. Specifically, the example of FIG. 3 further shows a shaft 220, a compressor wheel 240, a turbine wheel 260 as well as various additional components (not labeled).

With respect to the bearing 230, a cross-bore includes a lubricant inlet side portion 234 and a lubricant drainage side portion 236. An enlarged cross-sectional view shows various dimensions with respect to the shaft 220, the bearing 230 and the locating pin 250. Dimensions include a length ($X_L$) and a diameter ($D_L$) of the lower portion 286 of the cross-bore of the housing, a length ($X_P$) and a diameter ($D_P$) of the locating pin 250, a shaft-bearing clearance ($X_{SB}$), a shaft-pin clearance ($X_{SP}$), a locating pin extension distance ($X_E$) and a locating pin recess distance ($X_R$). For purposes of press-fit (e.g., a type of interference fit), a diameter of the locating pin 250 along its axial length ($D_P(X)$) is greater than a diameter $D_L$ of the lower portion 286 of the cross-bore of the housing 280. Further, for installation of the locating pin 250, the cross-bore of the bearing 230 (e.g., portions 234 and 236) have a diameter or diameters greater than the largest diameter of the locating pin 250 (e.g., to allow the locating pin 250 to enter the bearing 230).

As to the dimensions for the portion of the locating pin 250 extending into the opening 236 of the bearing 230, a clearance therebetween may be on the order of microns, for example, a clearance selected from a range of clearances from about 10 μm to about 50 μm. Such a clearance aims to allow for movement of the bearing 230 along the x-axis, for example, to benefit from a lubricant film (e.g., SFD) disposed between an outer surface of the bearing 230 and an inner surface of the through-bore 285 of the housing 280.

In the example of FIG. 3, the locating pin 250 includes end chamfers where one chamfer differs from the other (e.g., a lower end chamfered surface is larger than an opposing upper end chamfered surface). As described herein, a locating pin may include one or more chamfered end surfaces, further, a locating pin may be configured symmetrically for installation via either end or may be configured for installation in a particular orientation (e.g., a lubricant drain side end and a bearing side end).

As indicated in the example of FIG. 3, the portion of the locating pin 250 press-fit into the lower portion 286 of the cross-bore of the housing 280 has a diameter that is essentially the same as the diameter of lower portion 286 of the cross-bore of the housing 280. Specifically, the press-fit acts to equalize diameters, for example, enlarging or diminishing softer material responsive to contact with harder material. In general, a locating pin has a hardness that exceeds the hardness of a center housing, however, such hardness does not avoid scaring of the locating pin 250 during a press-fit process.

Figure 4:
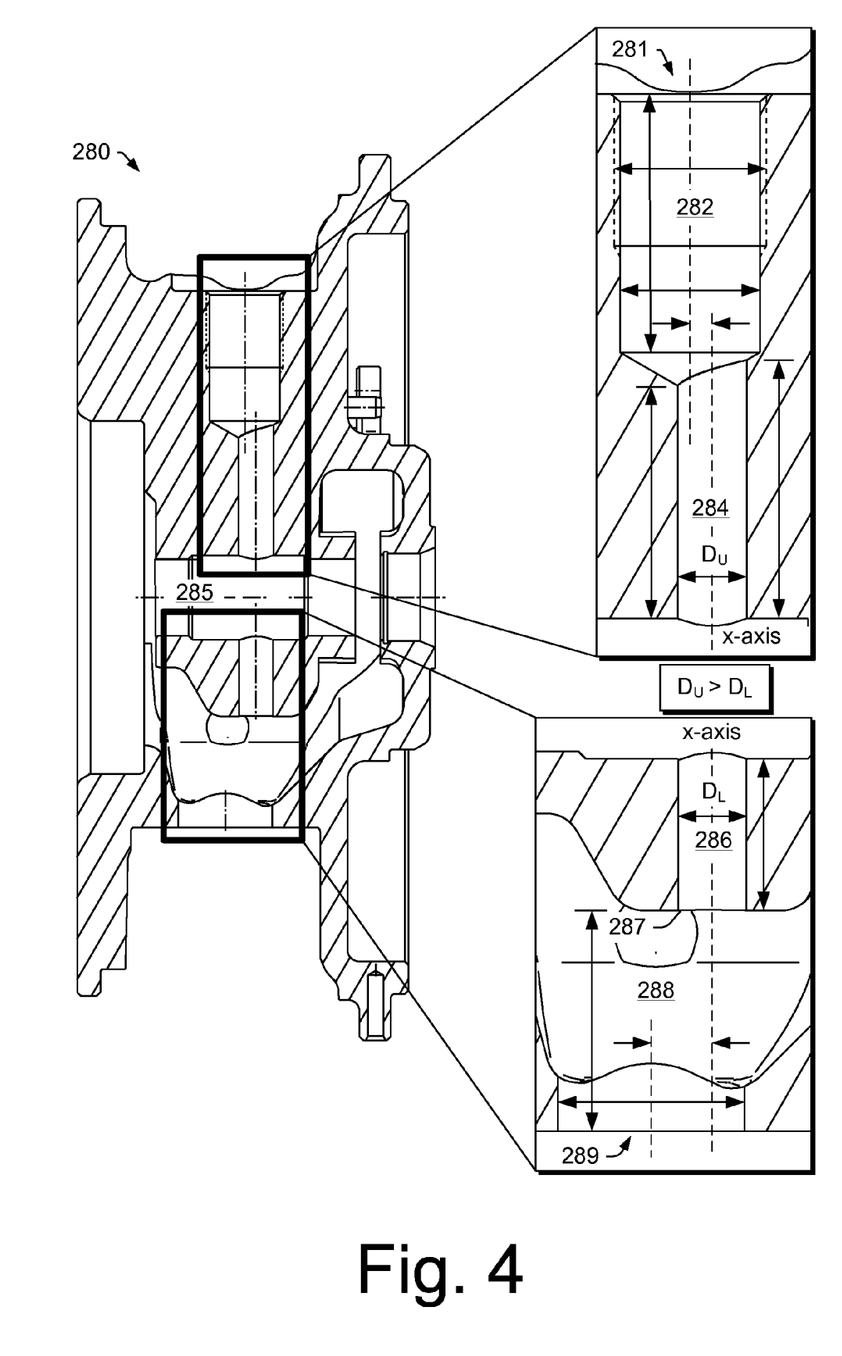
FIG. 4 is a cross-sectional side view of the center housing of the example of FIG. 3.

FIG. 4 shows various cross-sectional views of the housing 280. In an enlarged view associated with the lubricant inlet 281, the lubricant well 282 and the upper portion 284 of the cross-bore, various unlabeled dimensions are shown. As indicated in the example of FIG. 4, the x-axis is aligned with a central axis of the cross-bore of the housing 280 where the lubricant well 282 is formed to have a central axis that is offset from the x-axis. In the example of FIG. 4, the lubricant well 282 may include a threaded portion to connect a lubricant connector for a lubricant conduit. Lubricant provided to the well 282 may flow via the upper portion 284 of the cross-bore to the through-bore 285 of the housing 280. Where the through-bore 285 includes a semi-floating bearing, the lubricant may form a lubricant film (SFD) to support the semi-floating bearing.

In another enlarged view associated with the lower portion 286 of the cross-bore, the opening 287, the lubricant drain well 288 and the lubricant drain 289, various unlabeled dimensions are shown. As indicated in the example of FIG. 4, the lubricant drain 289 has a central axis that is offset from the x-axis. As to drainage of lubricant, various passages may direct lubricant to the lubricant drain well 288. As described herein, a locating pin may form a seal with the lower portion 286 of the cross-bore of the housing such that lubricant cannot flow from the through-bore 285 to the lower portion 286 of the cross-bore. Alternatively, a locating pin may optionally include one or more channels or passages that allow lubricant to flow, for example, from the through-bore 285 to the lubricant drain well 288.

As shown in FIG. 4, the upper portion of the cross-bore 284 includes a diameter $D_U$ while the lower portion of the cross-bore 286 includes a diameter $D_L$. To allow for passage of a locating pin from the upper portion to the lower portion, $D_U$ is greater than $D_L$. Further, for purposes of press-fitting a locating pin, a diameter of the locating pin ($D_P$) exceeds a diameter of the lower portion 286 of the cross-bore of the housing. Accordingly, a relationship may exist such that $D_U > D_P > D_L$.

As described herein, a turbocharger assembly can include: a housing with a through-bore and a cross-bore that intersects the through-bore to define an upper portion of the cross-bore and a lower portion of the cross-bore where a diameter of the upper portion is larger than a diameter of the lower portion; a bearing disposed in the through-bore of the housing; and a locating pin press-fit at least partially into the lower portion of the cross-bore of the housing and disposed at least partially in a cross-bore of the bearing to locate the bearing in the through-bore of the housing. In such an example, the upper portion of the cross-bore may be a lubricant passage and accessible via a lubricant inlet of the housing. As to press-fit of the locating pin, it may include a press-fit scarred portion press-fit into the lower portion of the cross-bore of the housing as well as an unscarred locating portion disposed at least partially in the cross-bore of the bearing to locate the bearing in the through-bore of the housing. As to the housing, it may include a lubricant inlet configured to communicate lubricant to the upper portion of the cross-bore of the housing and a lubricant drain configured to provide access to the lower portion of the cross-bore of the housing.

As described herein, a bearing may be a semi-floating bearing, for example, where a locating pin provides clearance that allows for movement of the semi-floating bearing responsive to squeeze film damper dynamics. As described herein, a bearing may be a unitary bearing or a multi-piece bearing. For example, a bearing may have an intermediate piece with a cross-bore disposed between two journal pieces (e.g., a compressor side journal piece and a turbine side journal piece) that may interlock with the intermediate piece.

Figure 5:
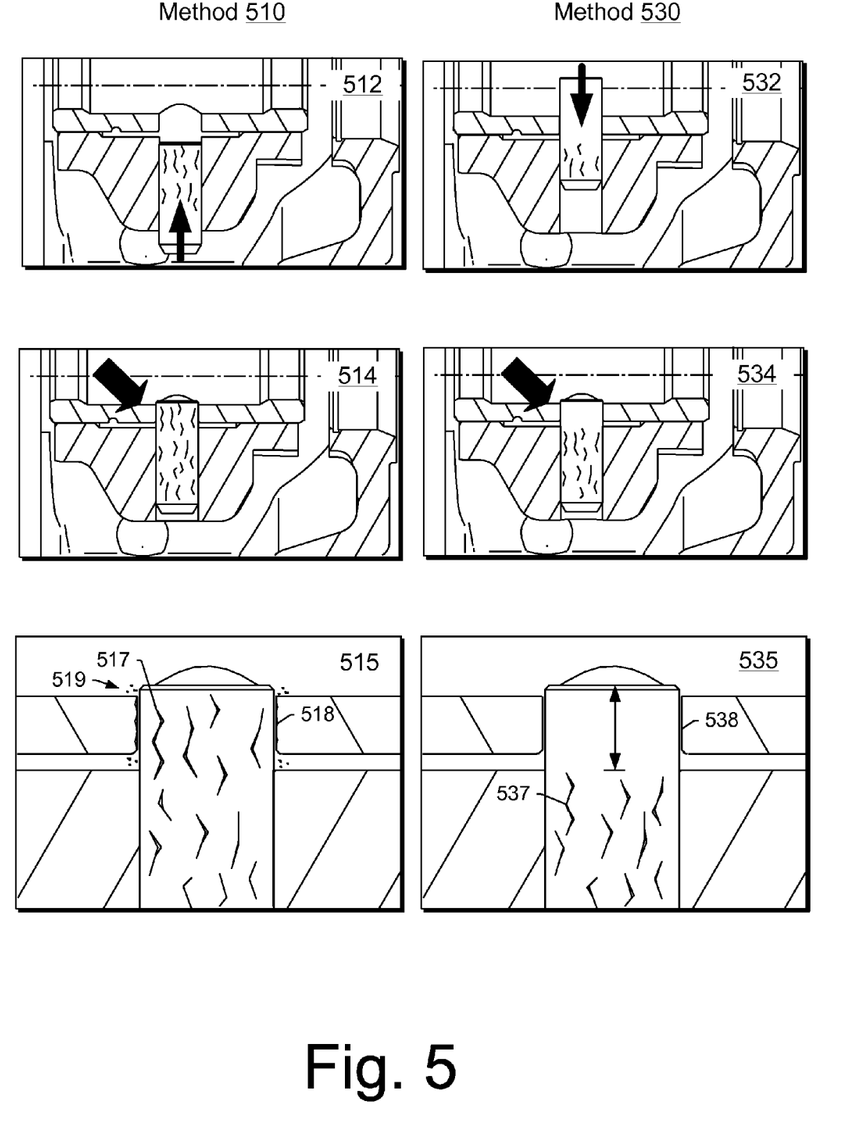
FIG. 5 is a series of views of an example of a bottom-up method and an example of a top-down method for installing a locating pin.

FIG. 5 shows examples of two methods 510 and 530 for installing a locating pin. In these examples, method blocks are shown where press-fit scarring of the locating pin is indicated by approximate graphics; noting that scarring of a bore receiving the locating pin may occur as well.

As described herein, a locating pin may optionally include one or more chamfered surfaces and a bore may optionally include one or more chamfered surfaces. Such surfaces may help guide movement of a locating pin with respect to a bore. As described herein, a press-fit installation process for a locating pin may optionally include thermal expansion, thermal contraction or both thermal expansion and contraction (e.g., or contraction and expansion). Such thermal effects (e.g., achieved via heating, cooling or a combination thereof) may be part of a shrink-fit process that accompanies a press-fit process. In general, friction force occurring during a press-fit process generates some heat energy, which may cause thermal expansion of a locating pin, a bore, a locating pin and a bore. Expansion, contraction or expansion and contraction may be quantifiable using dimensions, material properties (e.g., thermal expansion coefficient, etc.), process parameters, etc. For example, generation of heat energy may depend on factors such as velocity of a press-fit where a slower velocity may allow for diffusion of heat energy to control temperature (e.g., to reduce temperature maxima).

In general, a press-fit process aims to achieve a static friction force that maintains position of one component with respect to another component. During a press-fit process, dynamic friction force that occurs by moving one component with respect to another results in surface damage (e.g., press-fit scars), often to both components, which may be mirrored. For example, an article by Lewis et al. ("Measurement of Interference Pressure in Interference Fits", White Rose Research Online at http://eprints.whiterose.ac.uk/9180/, Professional Engineering Publishing, 2005), which is incorporated by reference herein, shows a photograph of surface damage for a shaft that was press-fit into a sleeve where the surface damage occurred in response to surface interactions between the shaft and the sleeve during a press-fit process. As noted by Lewis et al., where shrink-fit alone is used, the press-fit type of damage does not occur (e.g., thermal effects provide clearance sufficient to avoid sliding surface interactions); however, areas may exist where contact between components is minimal and such areas may be relatively large. As noted by Lewis et al.: "When press fitting, the surfaces of the shaft and sleeve push past one another. The surfaces plastically deform, removing any waviness in their topography, leading to a uniform contact. In shrink fitting the surfaces come together as the shaft expands, instead of sliding against each other. Hence, when shrink fitting an interference fit the contacting surfaces do not conform as much at the interface, leading to variations in the intensity of the contact."

During a press-fit process, localized seizure may occur, which can lead to surface damage. Further, where a cylinder is pressed all the way through a tight bore, the cylinder experiences compression followed by expansion. For such a cylinder, the cycle of compression followed by expansion can alter material integrity and make the cylinder more susceptible to wear, fracture, flaking, etc.

The method 510 includes press-fitting a locating pin into one end of a bore 512 and translating the locating pin such that a portion of the locating pin extends out of an opposing end of the bore 514. In such a method, damage may occur as shown in a diagram 515. Specifically, press-fit scars 517 may be generated along the entire length of a locating pin and, in particular, at a portion of the locating pin that has traversed the length of the bore to extend out of an end of the bore. This portion has traversed the greatest bore length of the locating pin and, consequently, may be expected to have more damage than other portions of the locating pin. Further, this portion has experienced compression followed by release of such compression. Fractures, stress lines, etc., caused by the press-fit process of the method 510 may lead to failure, surface roughness, etc. Surface roughness may, in turn, scar an inner surface of an opening of a bearing 518. Generation of debris 519 may occur upon press-fitting, after press-fitting or both upon and after press-fitting. Such debris may have detrimental consequences for operation of a bearing system of a turbocharger (e.g., constrain movement of the bearing, scar a journal surface, circulate via lubricant, etc.).

The method 530 includes press-fitting a locating pin into an end of a bore 532 and translating the locating pin such that a portion of the locating pin remains outside of the bore 534. In such a method, a portion of the locating pin does not experience surface interactions that would cause scarring, for example, as shown in a diagram 535 that illustrates approximate press-fit surface scars 537 and a portion 538 free of such surface scars. In such an example, the portion of the locating pin that can interact with an inner surface of an opening of a bearing has more integrity compared to a similarly positioned portion of a locating pin installed via the method 510.

Figure 6:
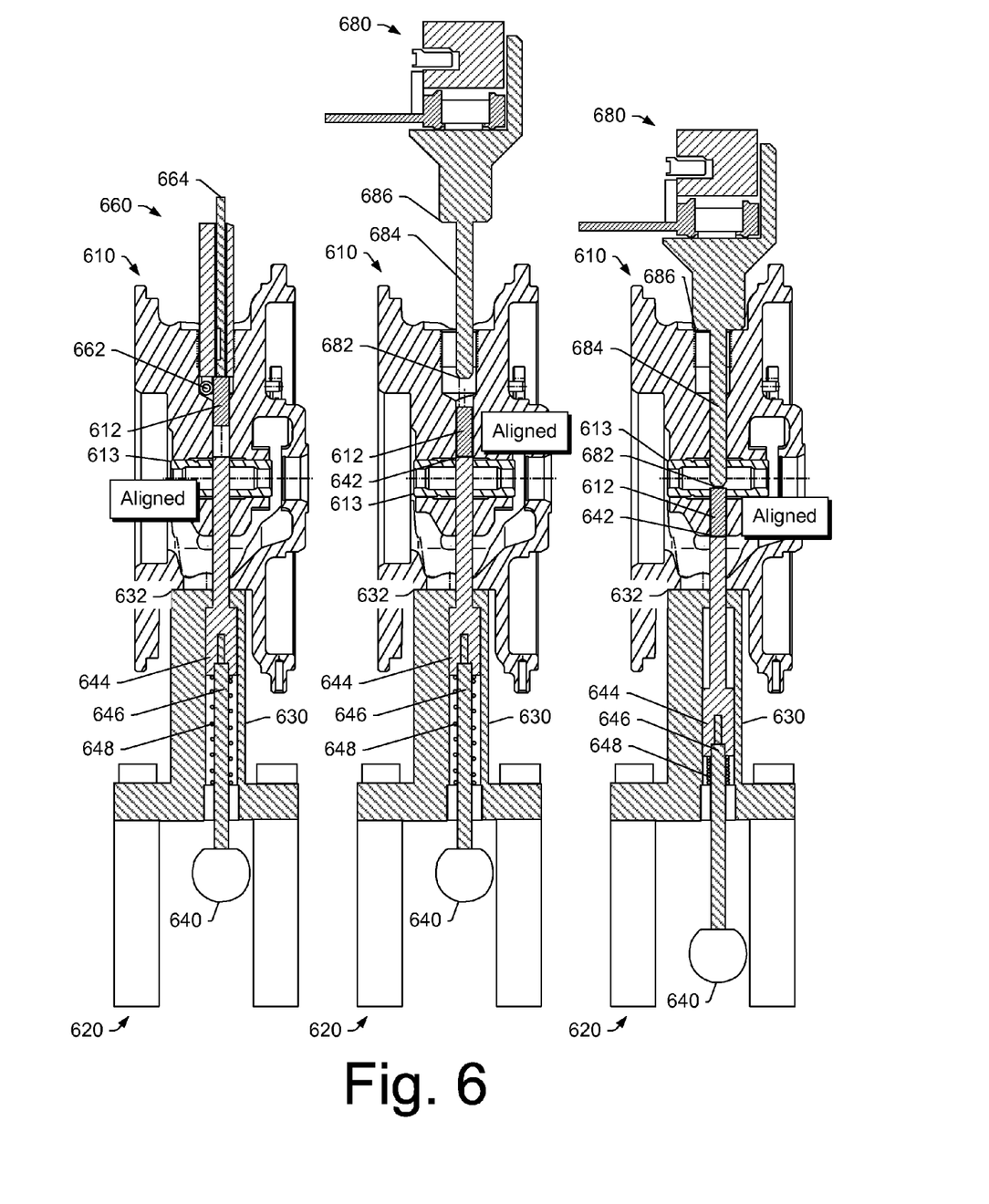
FIG. 6 is a series of views of examples of components for installing a locating pin.

FIG. 6 shows an example of an installation process and examples of installation tools, which include a lower assembly 620, a placement tool 660 and a force application tool 680, to install a locating pin 612 to locate a bearing 613 in a housing 610 (e.g., a turbocharger center housing). The lower assembly 620 may be a stand to support the housing 610 during an installation process for installing the locating pin 612. As shown, the lower assembly 620 includes a support member 630 to support the housing 610 at a support surface 632 (see, e.g., support block of FIG. 2) and to support a translatable plunger 644 fixed to a stem 646 biased by a spring 648. For manual translation of the plunger 644, a knob 640 is provided at an end of the stem 646. As described herein, other features may be provided for automated operation or a combination of manual and automated (e.g., machine controlled) operation.

As shown in FIG. 6, an installation process can include aligning a cross-bore of the bearing 613 with respect to a cross-bore of the housing 610 using the translatable plunger 644, placing the locating pin 612 into a cross-bore of the housing 610 using the placement tool 660, removing the placement tool 660, positioning a shaft 684 of the force application tool 680 to contact an end surface 682 of the tool 680 and the locating pin 612 and applying force to the locating pin 612 using the force application tool 680 to move and press-fit the locating pin 612 to an appropriate depth, for example, as indicated by the plunger 644 registering a termination point, as indicated by a surface 686 of the force application tool 680 contacting a surface of the housing 610, etc. In an example embodiment, contacting of the surface 686 and a minimal position of the plunger 644 (e.g., where the spring 646 is fully compressed over its linear force range) may both correspond to a proper position of the locating pin 612 in the assembly 610. For example, contact between a tool and a housing, a minimal plunger position or both may define a proper position of a locating pin in a housing.

With respect to the placement tool 660, such a tool can avoid or minimize occurrence of detrimental contact to the locating pin 612. Further, such a tool may act to minimize knocking around of a locating pin in a bore, lubricant well, etc., of a housing. The placement tool 660 may include a rotating wheel 662 (e.g., rubber or other material) and a plunger 664 such that depression of the plunger 664 allows the locating pin 612 to translate downwardly with minimal friction (e.g., minimal risk of surface damage). For example, the wheel 662 can guide and rotate in response to translational movement of the locating pin 612 caused by depression of the plunger 664. The plunger 664 of the tool 660 may allow for contacting the locating pin 612 with an end surface 642 of the plunger 644. Alternatively, the locating pin 612 (e.g., once free of the wheel 662) may slide under gravity within the cross-bore to contact the end surface 642 of the plunger 644.

As shown in the examples of FIG. 6, the plunger 644 aligns the cross-bore of the bearing 613 with the cross-bore of the housing 610 to minimize risk of contact between an end of the locating pin 612 and the bearing 613 (e.g., consider an outer surface being contacted due to misalignment of the cross-bores). Such an installation approach avoids a "blind" fit scenario that can occur with installation of a lubricant pin via a lubricant drain (e.g., without a cross-bore or a cross-bore alignment tool). As considerable force may be applied for a press-fit, in a blind fit scenario, force applied to a locating pin may damage the pin or a bearing if misalignment exists between these components. In the example of FIG. 6, the various tools act to align the cross-bores and avoid such types of contact. Further, when force is applied to press-fit the locating pin 612, its press-fit end has already cleared the bearing 613 and hence such damage can be avoided. Yet further, when force is applied to press-fit the locating pin 612, the shaft 684 of the tool 680 is disposed in the through-bore (e.g., axial bore) of the bearing 613 and limited or controlled in its downward motion to avoid contact between the end surface 682 and the bearing 613.

The installation approach of the example of FIG. 6 can also improve isostatism (e.g., provide for a more statically determinate configuration). In a lubricant drain installation approach (see, e.g., the method 510 of FIG. 5), poor isostatism may exist between a locating pin and a bearing, for example, where the pin is misplaced along and perpendicular to a rotational axis, which can lead to interferences at assembly or during operation (e.g., resulting in parasitic noise at the balancing stage or during operation). As described herein, a locating pin can include a cylindrical shape received by a cross-bore of a bearing to locate the bearing where the cylindrical shape is preserved upon installation and alignment of the locating pin ensured with respect to a rotation axis of a turbocharger shaft.

Per the examples of FIG. 6, the tool 660 allows for insertion of the locating pin 612 to a proper position in the center housing 610, the plunger 644 enables keeping a bearing in a proper axial and angular position in the center housing (e.g., before introducing the locating pin). Further, the spring 648 may apply force sufficient to overcome the force of gravity for its mass and that of a locating pin to allow the plunger 644 to maintain the locating pin in a top position (e.g., a proper placement position). Yet further, as the shaft 684 of the tool 680 is pushed downwardly against a locating pin, the plunger 644 helps to guide the locating pin through a cross-bore of the bearing, maintaining the bearing in a proper position to avoid damage. As the shaft 644 enters the cross-bore of the bearing, the shaft 644 and the locating pin help to keep the bearing in a proper position while the locating pin is press-fit into a lower cross-bore of the housing.

Figure 7:
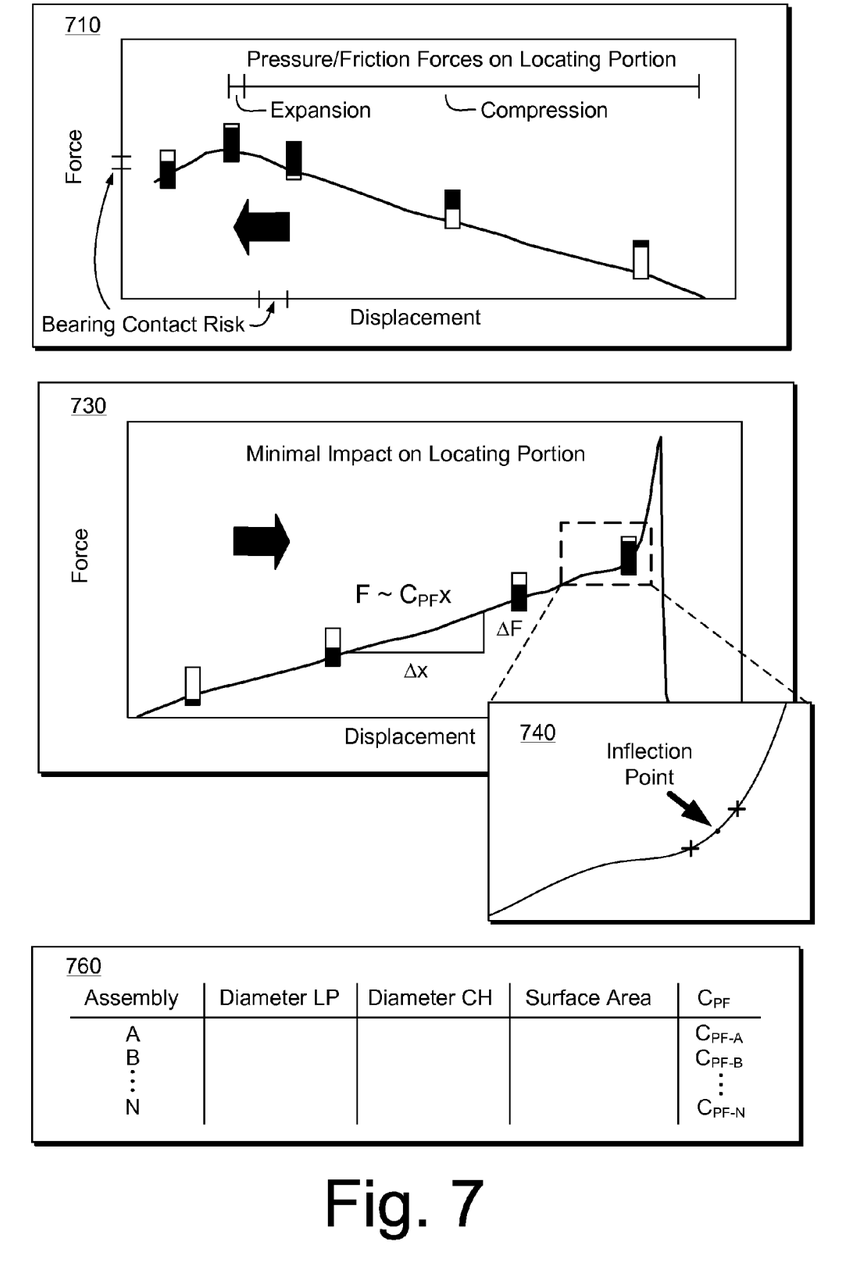
FIG. 7 is a series of views of an example plot of force versus displacement and an example table of assembly parameters.

FIG. 7 shows examples of plots 710 and 730 that may correspond to the methods 510 and 530 of FIG. 5, respectively, and an example of a table 760 of parameters.

The plot 710 shows force versus displacement for an installation process that press-fits a locating pin into a bore of a housing from the bottom-up, for example, as explained with respect to the method 510 of FIG. 5. In the plot 710, locating pin graphics indicate the region of the locating pin that is in the bore at particular displacements (see, e.g., black portion of the locating pin graphics). Accordingly, an end of the locating pin experiences compression followed by expansion. The compression may be characterized, at least in part, by an area under the force displacement curve. Further, as indicated along the displacement axis, for some displacement, a risk exists that the pin will contact the bearing. According to the force versus displacement curve, the corresponding force is near the maximum force applied for the press-fit. Such force may be so great that contact between the pin and the bearing goes unnoticed or becomes noticed only after damage has occurred.

The plot 730 shows force versus displacement for an installation process that press-fits a locating pin into a bore of a housing from the top-down, for example, as explained with respect to the method 530 of FIG. 5. In the plot 730, locating pin graphics indicate the region of the locating pin that is in the bore at particular displacements (see, e.g., black portion of the locating pin graphics). As indicated, one end of the locating pin is never in the bore. Further, as shown in an enlarged plot 740, an inflection point in the force versus displacement curve may be relied upon as an indicator that a locating pin has reached a proper position. For example, referring to spring biased plunger 644 of FIG. 6, the inflection point may be a consequence of the spring 646 "bottoming out". Yet further, by the time force is applied, the end of the locating pin would have already passed through a cross-bore of a bearing (e.g., under force of gravity where any contact would be noticeable).

The plot 730 further shows a relatively linear region that may be characterized by a press-fit constant $C_{PF}$. In such an example, the force required for press-fitting a locating pin into a bore increases approximately linearly with respect to depth of the locating pin in the bore. In general, as force of press-fitting may be substantial, contribution of force required to compress a spring biased plunger may be minimal along the "linear", normal operating range of the spring. However, once the spring is fully "normally" compressed, the force required to further compress the spring may be greater than the force required to further press-fit the locating pin. Accordingly, for further press-fit displacement, the slope of the force versus displacement curve increases. As mentioned, the point at which the slope increases (e.g., optionally within some range as indicated in the plot 740), may be relied upon as an indicator that the locating pin has reached its proper position and that application of press-fitting force should be terminated. As mentioned, a mechanical stop may be formed by contacting a force application tool and a housing. In such an example, the slope of a force versus displacement curve will increase as little to no further displacement may occur upon contact of the tool and the housing in response to an increase in force.

As to the table 760, each assembly may have particular parameters such as a locating pin diameter, a center housing cross-bore diameter, a surface area, etc., that may be relied on to determine or estimate a press-fit force versus displacement constant $C_{PF}$ (e.g., F~$C_{PF}$x). Such a constant may be relied on to determine velocity of a press-fit process (e.g., plunger velocity). For example, where heat generation may be a concern, total force to achieve a particular displacement may be calculated and used to determine a velocity schedule that acts to control temperature during a press-fit process.

Figure 8:
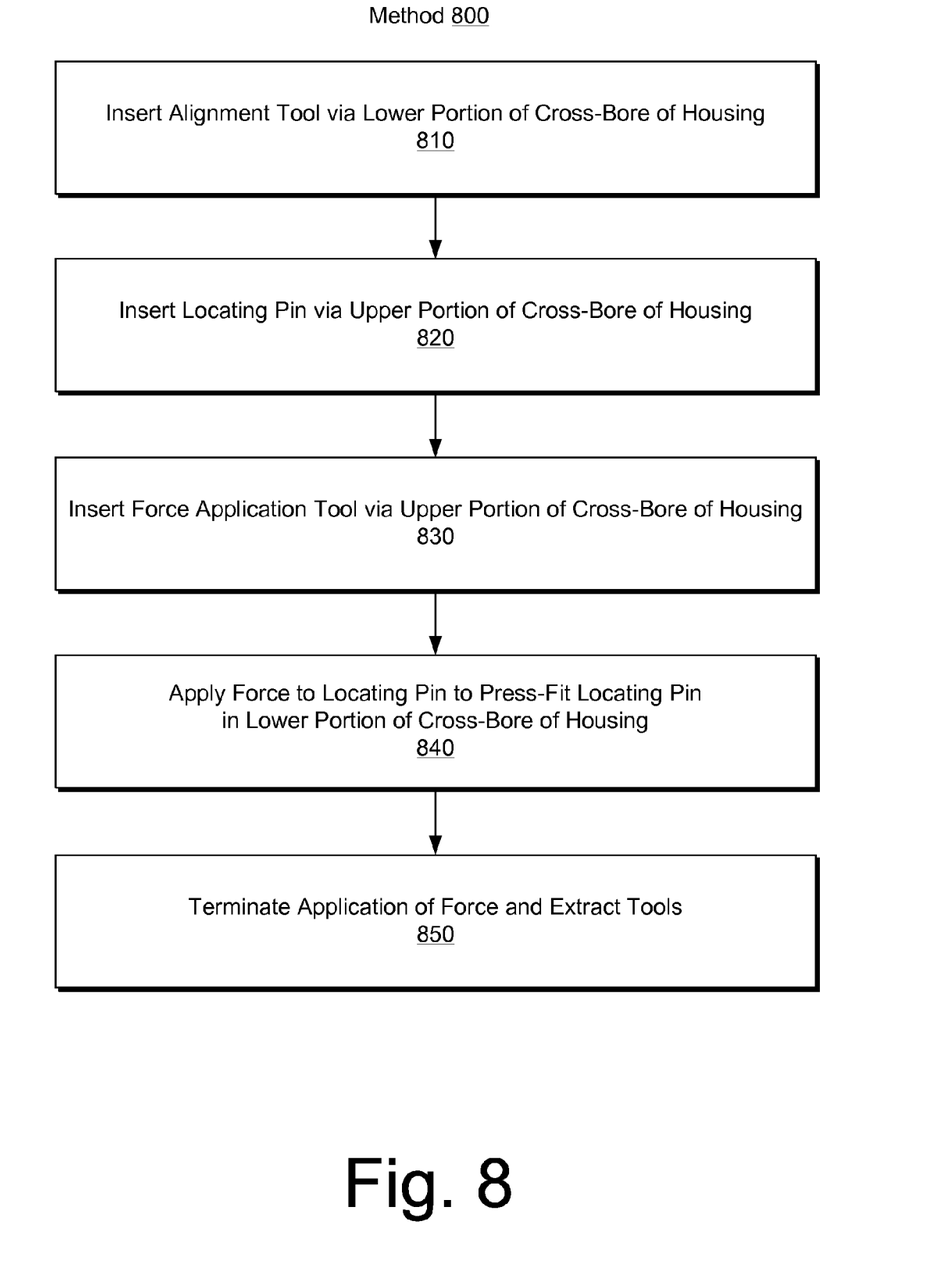
FIG. 8 is a block diagram of an example of a method to install a locating pin.

FIG. 8 shows an example of a method 800 for installing a locating pin. The method 800 includes an insertion block 810 for inserting an alignment tool via a lower portion of a cross-bore of a housing (e.g., via a lubricant drain of the housing), an insertion block 820 for inserting a locating pin via an upper portion of the cross-bore of the housing (e.g., via a lubricant inlet of the housing), an insertion block 830 for inserting a force application tool via the upper portion of the cross-bore of the housing, an application block 840 for applying force to the locating pin via the force application tool to press-fit the locating pin in the lower portion of the cross-bore of the housing, and a termination block 850 for terminating the application of force and, for example, for extracting the tools.

Figure 9:
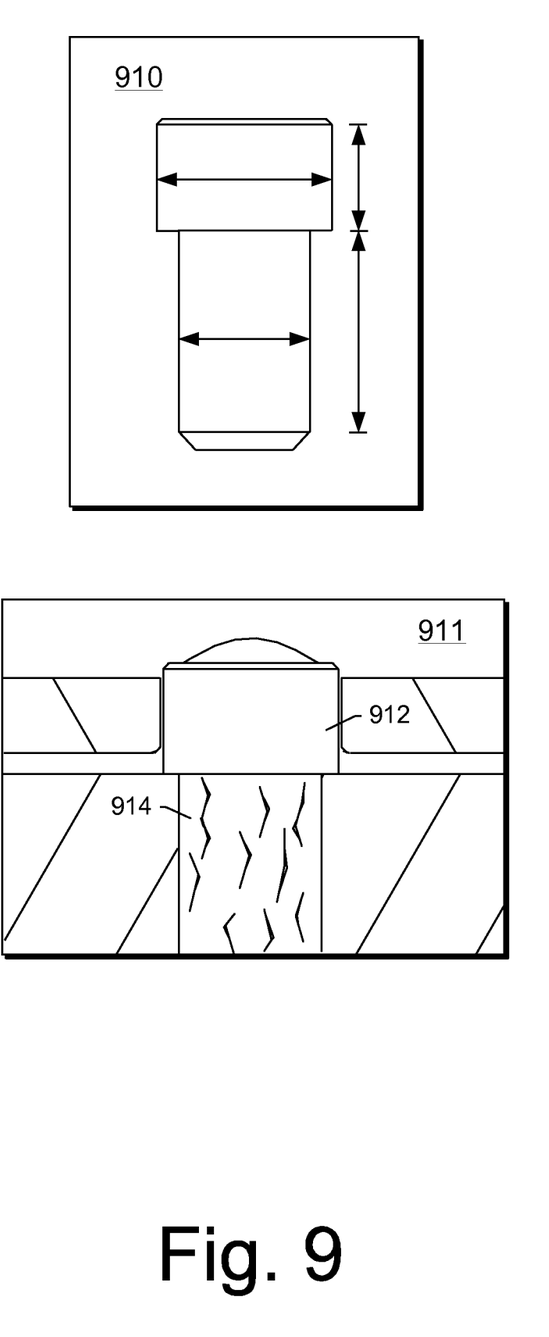
FIG. 9 is a series of views of an example of a locating pin and an example of an assembly that includes the locating pin.

FIG. 9 shows an example of a locating pin 910 that comprises a head portion 912 and a stem portion 914 and an example of the locating pin 910 with respect to components of an assembly 911. In the example of FIG. 9, the locating pin 910 may be installed via an upper portion of a cross-bore of a housing such that the step portion 914 is press-fit into a lower portion of a cross-bore of the housing whereby the head portion 912 is disposed in an opening of a bearing (e.g., a portion of a cross-bore of the bearing) to locate the bearing in the housing.

As described herein, a locating pin installation assembly can include a force application tool that includes a shaft and a spring biased plunger that has a spring constant sufficient to overcome force of gravity for mass of the plunger and mass of a locating pin disposed at an end of the plunger and that allows for application of force sufficient to press-fit a locating pin into a bore of a turbocharger housing. As to the force application tool, it may include a surface configured to form a contact with a housing to indicate a predetermined displacement of a locating pin in a bore of a turbocharger housing. As described herein, a spring biased plunger may include a displacement range characterized by a spring constant as a linear relationship of force versus displacement. In such an example, displacement of the spring biased plunger in excess of a maximum displacement of the displacement range may alter the linear relationship and indicate a predetermined displacement of a locating pin in a bore of a turbocharger housing (e.g., for purposes of terminating application of force to press-fit a locating pin).

As described herein, a method can include: positioning a bearing in a through-bore of a turbocharger housing to align a cross-bore of the bearing and a cross-bore of the turbocharger housing where the cross-bore of the turbocharger housing intersects the through-bore and includes a large diameter portion on one side of the through-bore and a small diameter portion on an opposing side of the through-bore; placing a locating pin in the large diameter portion of the cross-bore of the turbocharger housing; and press-fitting a portion of the locating pin into the small diameter portion of the cross-bore of the turbocharger housing. In such a method, positioning may be achieve by inserting a plunger into the cross-bore of the turbocharger housing and into the cross-bore of the bearing, for example, where inserting the plunger occurs via the small diameter portion of the cross-bore of the turbocharger housing.

As to application of force for press-fitting a locating pin, a method can include disposing a shaft into a large diameter portion of a cross-bore of a turbocharger housing, contacting the locating pin and the shaft and applying force to the shaft to press-fit the locating pin into a small diameter portion of the cross-bore of the turbocharger housing. Where large diameter and small diameter are used, one would understand that these relative terms sufficiently indicate that the large diameter is larger than the small diameter. As to press-fitting, as explained, such a process can impart press-fit scars to a portion of a locating pin, for example, to only a portion that is press-fit (e.g., received by a bore). As described herein, a press-fit process or press-fitting may be terminated, for example, in response to an increase in force with respect to displacement of the locating pin. One or more techniques may be applied to indicate such an increase in force with respect to displacement (e.g., sensors, stops, etc.).

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein. A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit. Such a controller may optionally be programmed to control lubricant flow to a turbocharger, lubricant temperature, lubricant pressure, lubricant filtering, exhaust gas recirculation, etc. Such a controller may optionally be programmed to perform, monitor, etc., a press-fit process. For example, such a controller may be programmed to monitor force, control a force application tool, etc. Such a controller may optionally be programmed to perform one or more actions described with respect to example methods described herein or other methods.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A turbocharger assembly comprising:
    a housing that comprises a housing through-bore and a housing cross-bore that intersects the housing through-bore to define an upper portion of the housing cross-bore that comprises a first diameter and a lower portion of the housing cross-bore that comprises a second diameter wherein the first diameter exceeds the second diameter;
    a bearing disposed in the housing through-bore of the housing wherein the bearing comprises a bearing through-bore configured to support a shaft and a bearing cross-bore that intersects the bearing through-bore; and
    a locating pin that comprises a diameter that exceeds the second diameter of the lower portion of the housing cross-bore, the locating pin press-fit at least partially into the lower portion of the housing cross-bore and disposed at least partially in the lower portion of the bearing cross-bore to locate the bearing in the housing through-bore.

2. The turbocharger assembly of claim 1 wherein the upper portion of the housing cross-bore comprises a lubricant passage.

3. The turbocharger assembly of claim 1 wherein the locating pin comprises a press-fit scarred portion press-fit into the lower portion of the housing cross-bore and an unscarred locating portion disposed at least partially in the lower portion of the bearing cross-bore to locate the bearing in the housing through-bore.

4. The turbocharger assembly of claim 3 wherein the press-fit scarred portion comprises press-fit scars from a press-fit of the locating pin into the lower portion of the housing cross-bore.

5. The turbocharger assembly of claim 1 wherein a diameter of the lower portion of the bearing cross-bore exceeds the diameter of the locating pin.

6. The turbocharger assembly of claim 1 wherein the housing comprises a lubricant inlet configured to communicate lubricant to the upper portion of the housing cross-bore and a lubricant drain configured to provide access to the lower portion of the housing cross-bore.

7. The turbocharger assembly of claim 1 wherein an axis of the housing cross-bore, an axis of the bearing cross-bore and an axis of the locating pin substantially align.

8. The turbocharger assembly of claim 7 wherein the axis of the bearing cross-bore intersects an axis of the housing through-bore.

9. The turbocharger assembly of claim 1 wherein the bearing comprises a semi-floating bearing.

10. The turbocharger assembly of claim 9 wherein the locating pin provides clearance that allows for movement of the semi-floating bearing responsive to squeeze film damper dynamics.

11. A method comprising:
 positioning a bearing in a through-bore of a turbocharger housing to align a cross-bore of the bearing and a cross-bore of the turbocharger housing wherein the cross-bore of the turbocharger housing intersects the through-bore and the turbocharger housing and comprises a large diameter portion on one side of the through-bore and a small diameter portion on an opposing side of the through-bore;
 placing a locating pin in the large diameter portion of the cross-bore of the turbocharger housing; and
 press-fitting a portion of the locating pin into the small diameter portion of the cross-bore of the turbocharger housing.

12. The method of claim 11 wherein the positioning comprises inserting a plunger into the cross-bore of the turbocharger housing and into the cross-bore of the bearing.

13. The method of claim 12 wherein the positioning comprises inserting the plunger via the small diameter portion of the cross-bore of the turbocharger housing.

14. The method of claim 11 wherein the press-fitting comprises disposing a shaft into the large diameter portion of the cross-bore of the turbocharger housing, contacting the locating pin and the shaft and applying force to the shaft to press-fit the locating pin into the small diameter portion of the cross-bore of the turbocharger housing.

15. The method of claim 11 wherein the press-fitting comprises imparting press-fit scars to only a portion of the locating pin.

16. The method of claim 11 further comprising terminating the press-fitting in response to an increase in force with respect to displacement of the locating pin.

17. A method comprising:
 positioning a bearing in a through-bore of a turbocharger housing to align a cross-bore of the bearing and a cross-bore of the turbocharger housing wherein the cross-bore of the turbocharger housing intersects the through-bore and comprises a large diameter portion on one side of the through-bore and a small diameter portion on an opposing side of the through-bore;
 placing a locating pin in the large diameter portion of the cross-bore of the turbocharger housing; and
 press-fitting a portion of the locating pin into the small diameter portion of the cross-bore of the turbocharger housing.
 wherein the positioning comprises inserting a plunger into the cross-bore of the turbocharger housing and into the cross-bore of the bearing and wherein the positioning comprises inserting the plunger via the small diameter portion of the cross-bore of the turbocharger housing.

18. The method of claim 17 wherein the inserting the plunger via the small diameter portion of the cross-bore of the turbocharger housing comprises inserting an end of the plunger into a lubricant drain of the turbocharger housing for accessing an opening of the small diameter portion of the cross-bore of the turbocharger housing and for inserting the end of the plunger therein.

* * * * *